(12) United States Patent
Gruendler (10) Patent No.: US 7,877,622 B2
(45) Date of Patent: Jan. 25, 2011

(54) SELECTING BETWEEN HIGH AVAILABILITY REDUNDANT POWER SUPPLY MODES FOR POWERING A COMPUTER SYSTEM

(75) Inventor: Nickolas J. Gruendler, Pflugerville, TX (US)

(73) Assignee: International Business Machines Corporation, Armonk, NY (US)

(*) Notice: Subject to any disclaimer, the term of this patent is extended or adjusted under 35 U.S.C. 154(b) by 627 days.

(21) Appl. No.: 11/956,247

(22) Filed: Dec. 13, 2007

(65) Prior Publication Data

US 2009/0158070 A1    Jun. 18, 2009

(51) Int. Cl.
 *G06F 1/26* (2006.01)
(52) U.S. Cl. .................. 713/340; 713/310; 307/18; 307/64; 323/299
(58) Field of Classification Search ................ 713/310, 713/340; 307/18, 64; 323/299
 See application file for complete search history.

(56) References Cited

U.S. PATENT DOCUMENTS

| 5,747,889 | A | * | 5/1998 | Raynham et al. | ............... 307/80 |
| 6,031,298 | A |   | 2/2000 | Lo et al. |  |
| 6,298,449 | B1 | * | 10/2001 | Carter | ........................ 713/340 |
| 6,608,403 | B2 |   | 8/2003 | Liu et al. |  |
| 6,621,180 | B2 |   | 9/2003 | Dishman et al. |  |
| 6,639,329 | B2 |   | 10/2003 | Chan et al. |  |
| 6,639,816 | B2 |   | 10/2003 | Liu |  |
| 7,284,140 | B2 | * | 10/2007 | Suzuki et al. | ............... 713/340 |
| 7,421,596 | B2 | * | 9/2008 | Fukumori | ................... 713/300 |

OTHER PUBLICATIONS

Crippen, et al.; BladeCenter Packaging, Power, and Cooling; IBM J. Res. & Dev.; Nov. 2005; pp. 887-904; vol. 49 No. 6; IBM.

* cited by examiner

*Primary Examiner*—Thuan N Du
(74) *Attorney, Agent, or Firm*—Brandon C. Kennedy; Cynthia G. Seal; Biggers & Ohanian, LLP (57) ABSTRACT

Methods, apparatus, and products for selecting a redundant power supply mode for powering a computer system are disclosed that include detecting, by a voltage monitoring module, an input voltage level of a power supply; determining, by the voltage monitoring module, whether the input voltage level of the power supply is greater than a predetermined threshold value; if the input voltage level of the power supply is greater than the predetermined threshold value, configuring, by the voltage monitoring module, the power supply for an N+N redundant power supply mode having N primary power supplies and N redundant power supplies; and if the input voltage level of the power supply is not greater than the predetermined threshold value, configuring, by the voltage monitoring module, the power supply for an N+M redundant power supply mode having N primary power supplies and M redundant power supplies, where N is greater than M.

20 Claims, 5 Drawing Sheets

SELECTING BETWEEN HIGH AVAILABILITY REDUNDANT POWER SUPPLY MODES FOR POWERING A COMPUTER SYSTEM

BACKGROUND OF THE INVENTION

1. Field of the Invention

The field of the invention is data processing, or, more specifically, methods, apparatus, and products for selecting a redundant power supply mode for powering a computer system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Many computer systems today require high availability. To provide such high availability power supplies powering a computer system are often configured in various redundant power supply schemes where a fault of one or more of the power supplies does not interrupt operations of the computer system. Some power supply schemes provide a greater power output than others at the cost of redundancy. In addition, the power output of a power supply may vary with the AC inputs voltage level of the power supply—a higher AC input may allow a higher output power level from the power supply. To provide greater maximum output power to a computer system as well as redundancy, therefore, it would be useful to configure power supplies operating with a lower AC input in a redundant power supply scheme providing greater maximum output power and configure power supplies operating at a higher AC input in a redundant power supply scheme providing greater redundancy with lesser maximum output power.

SUMMARY OF THE INVENTION

Methods, apparatus, and products for selecting a redundant power supply mode for powering a computer system are disclosed that include detecting, by a voltage monitoring module, an input voltage level of a power supply; determining, by the voltage monitoring module, whether the input voltage level of the power supply is greater than a predetermined threshold value; if the input voltage level of the power supply is greater than the predetermined threshold value, configuring, by the voltage monitoring module, the power supply for an N+N redundant power supply mode having N primary power supplies and N redundant power supplies; and if the input voltage level of the power supply is not greater than the predetermined threshold value, configuring, by the voltage monitoring module, the power supply for an N+M redundant power supply mode having N primary power supplies and M redundant power supplies, where N is greater than M.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
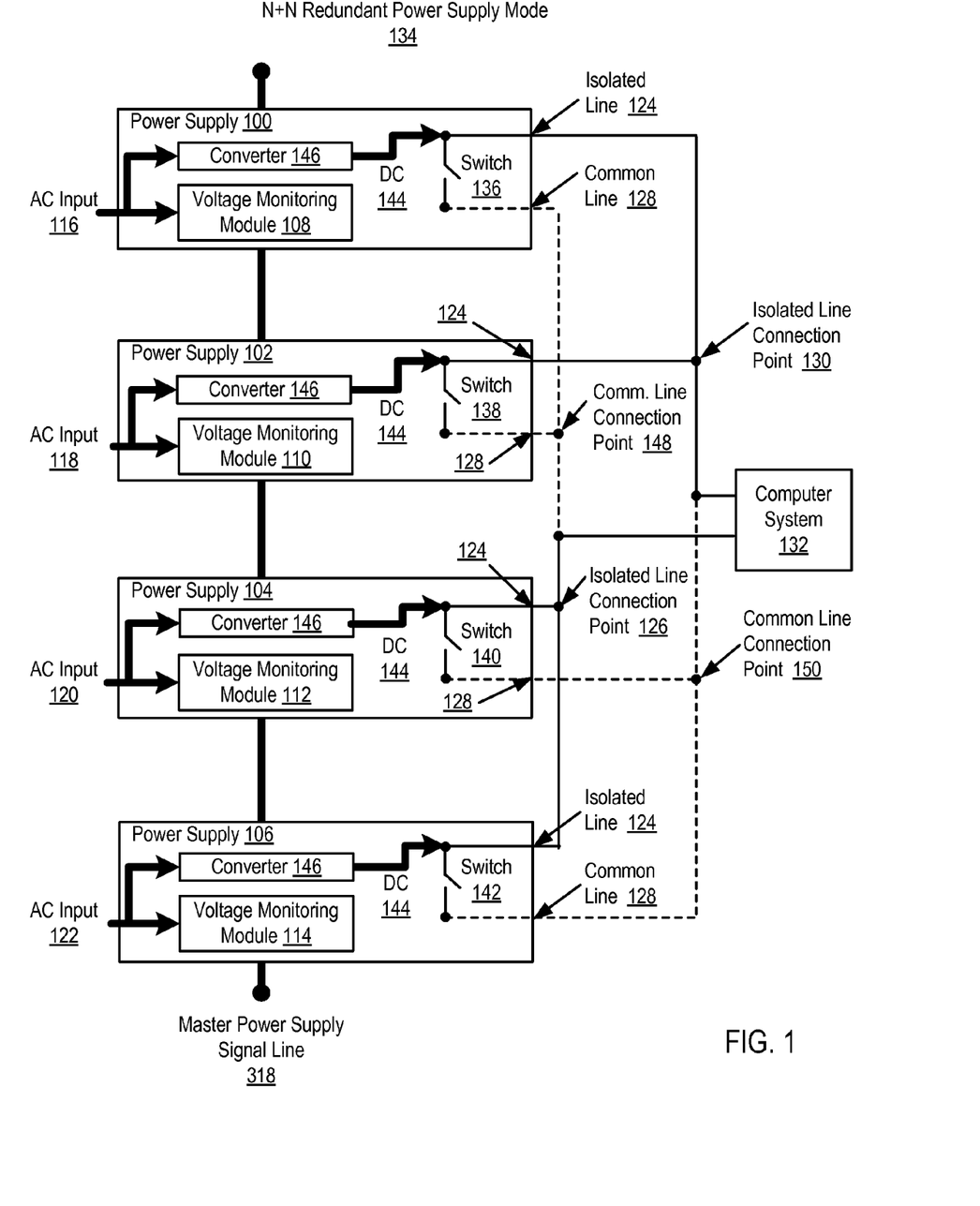
FIG. 1 sets forth a functional block diagram of an exemplary system for selecting a redundant power supply mode for powering a computer system that includes power supplies configured in an N+N redundant power supply mode.

Exemplary methods, apparatus, and products for selecting a redundant power supply mode for powering a computer system in accordance with the present invention are described with reference to the accompanying drawings, beginning with FIG. 1. FIG. 1 sets forth a functional block diagram of an exemplary system for selecting a redundant power supply mode for powering a computer system that includes power supplies configured in an N+N redundant power supply mode (134).

A redundant power supply mode is a configuration of multiple power supplies for providing redundant power to a computer system. There are several different redundant power supply modes, each providing various levels of redundancy and maximum power output when under fault. One mode is an N+N redundant power supply mode in which N primary power supplies are configured with N redundant power supplies, two primary and two redundant, for example. An N+N redundant power supply mode is typically used when the primary and redundant power supplies are powered by a separate AC sources. When one AC source fails N power supplies also fail, while the N power supplies powered by the non-failed AC source are used to power the computer system. Consider, for example, an N+N configuration with four power supplies, two primary and two redundant, providing power to a computer system. The two primary power supplies are powered with a utility AC source and two redundant power supplies are powered with an Uninterruptible Power Supply ('UPS') AC source. When the utility source fails, the two primary power supplies also fail while the redundant power supplies, still powered with the UPS AC source, continue to power the computer system.

Another redundant power supply mode is an N+M redundant mode where N is greater than M. In the N+M mode there are N number of primary power supplies and M number of redundant power supplies. Although M is typically one, it may also be any other number of power supplies less than N.

An N+M redundant mode is typically used when all primary and redundant power supplies are powered by a single AC source and the computer system can continue to operate with a failure of M power supplies. Consider, for example, an N+M configuration, with four power supplies, three primary power supplies and one redundant power supply, providing power to a computer system. In this configuration the computer system may continue to operate if only one power supply fails.

As mentioned above, different redundant power supply schemes also provide different maximum output power when under fault. Power supplies configured in an N+N redundant power supply mode, for example, typically provide less power under fault than the same power supplies configured in an N+M redundant power supply mode. Consider four power supplies, for example, configured in an N+N redundant power supply mode. Under fault only two of the power supplies are providing power to the computer system. If each power supply is capable of providing 1000 Watts of power, then the maximum power output provided by the configuration of power supplies is 2000 Watts. Consider the same four power supplies configured in an N+M redundant power supply mode. Under fault three power supplies are providing power to the computer system. If each power supply is capable of providing 1000 watts of power, then the maximum power output provided by the configuration of power supplies is 3000 Watts.

Consider also that AC inputs to a power supply may be of any voltage level. Typical AC input voltage levels for example include a low-line 110 VAC and a high-line 220 VAC. A power supply's output power may vary according to the voltage level of its AC input. A power supply may, for example, be capable of providing 1450 Watts when the AC input is 220 VAC, but only capable of providing 900 Watts when the AC input is 110 VAC.

To provide greater maximum output power to a computer system as well as redundancy, therefore, power supplies may be configured in an N+M redundant power supply mode when operating with a low-line AC input and be configured in an N+N redundant power supply mode when operating with a high-line AC input. The N+M redundant power supply mode provides less redundancy and fault tolerance, and greater maximum power output than the N+N redundant power supply mode.

The system of FIG. 1 includes a computer system (132) powered by several power supplies (100, 102, 104, 106) configured in a N+N redundant power supply mode (134). The computer system (132) includes two separate inputs for power. These inputs are typically combined together, more specifically 'ORed' together, inside the computer system for power distribution to modules and devices making up the computer system. An example of computer systems having two power inputs includes blade servers installed in a blade center. Readers of skill in the art will recognize that computers useful in systems that select a redundant power supply mode according to embodiments of the present invention may alternatively have only one power input, the power input being an electrically 'ORed' combination of the separate inputs shown in FIG. 1. That is, the power inputs of the computer system (132) in the example of Figure may be combined into a single input line before connecting to the computer system (132).

Each power supply in the example of FIG. 1 includes one input, connected to an AC input voltage source. Typically each AC input voltage source is the same voltage level, all 220 VAC for example, but in some embodiments the AC input voltage sources may have different voltage levels. The AC input voltage sources are converted from an AC power source to a DC power source (144) by a converter (146) included in each of the power supplies.

Each power supply in the example of FIG. 1 also includes two output and output paths capable of being electrically connected. Although the power supplies in the example of FIG. 1 are depicted as having two distinct outputs, readers of skill in the art will recognize that the power supplies may have only a single output that connects to two output paths, a common line and a isolated line. In the example of FIG. 1 switches (136,138,140,142), when closed, electrically connect the outputs of the power supplies. Such switches may be implemented as a JFET switch, MOSFET switch, CMOS switch, BJT switch, and so on. Although the switches in the example of FIG. 1 are shown for clarity as part of the power supply, readers of skill in the art will recognize that such switches useful in electrically connecting output paths of power supplies may be implemented separate and apart from the power supply. Such switches may, for example, be implemented as part of a backplane of a computer equipment rack.

One of the outputs of each of the power supplies is an isolated line (124) and one of the outputs of each of power supplies is a common line (128). In the example of FIG. 1, the switches (136,138,140,142) are open and the isolated lines (124) are carrying current from the power supplies to the computer system while the common lines (128), shown in FIG. 1 as dashed lines, are not carrying current from the power supplies to the computer system.

Half of the power supplies' (100,102) isolated lines (124) in the example of FIG. 1 are connected together at an isolated line connection point (130). The other half of the power supplies' (104,106) isolated lines (124) are connected together at another isolated line connection point (126). Also in the example of FIG. 1, half of the power supplies' (100, 102) common lines (128) are connected together at a common line connection point (132), and the other half of the power supplies' (104,106) common lines (128) are connected together at another common line connection point (132). Each of the common line connection points (132) are electrically connected to an isolated line connection point (130). Each common line connection point carries current only when the output paths of the power supplies are electrically connected. That is, the common line connection point may include a diode for one way current transmission or other hardware for controlling current flow as will occur to those of skill in the art.

An isolated line is an output path of a power supply for providing power to a computer system that connects to other output paths of power supplies. An isolated line is referred to in this specification as 'isolated' because when the output paths of the power supplies are electrically disconnected, the isolated lines of a group of the power supplies are connected to one isolated line connection point, and the isolated lines of another group of the power supplies are connected to another isolated line connection point, the two isolated line connection points are electrically independent, or 'isolated.' That is, when the switches in FIG. 1 are open, the isolated line connection points (126,130) are not electrically connected to one another, and there are two distinct, electrically independent power inputs for the computer system (132).

A common line, like an isolated line, is also an output path of a power supply for providing power to a computer system that connects to other output paths of power supplies. A common line is referred to in this specification as 'common' because when the output paths of the power supplies are electrically connected, the common lines of a group of the power supplies are connected to one common line connection point, and the common lines of another group of the power supplies are connected to another common line connection point, the two common line connection points (148,150) electrically connect all output paths off the power supplies, isolated and common lines, creating shared or 'common' power paths from the power supplies to the computer system. That is, when the switches in FIG. 1 are closed, the common line connection points (148,150) are electrically connected to one another and the isolated line connection points, and the two power inputs of the computer system (132) each share power from all power supplies.

Each power supply of FIG. 1 also includes a voltage monitoring module (108,110,112,114). A voltage monitoring module is an aggregation of hardware and software for monitoring the input voltage level of a power supply and controlling electrical connection between output paths of the power supply, in this example, by opening and closing the switches (136,138,140,142). The voltage monitoring modules of FIG. 1 are shown for clarity as part of the power supply. Readers of skill in the art will recognize, however, that such voltage monitoring modules useful in systems that select a redundant power supply mode for powering a computer system in accordance with embodiments of the present invention may also be implemented as a standalone device, physically separate from a power supply.

The system of FIG. 1 operates generally for selecting a redundant power supply mode by detecting, by a voltage monitoring module (108,110,112,114), an input voltage level (116,118,120,122) of a power supply (100,102,104,106). As mentioned above, an AC input voltage may vary in voltage level. Because AC input voltage levels are typically either hi-line or low-line levels such as, 220 VAC or 110 VAC, input voltage levels in this specification will generally be referred to as high-line or low-line. This is for clarity, however, not for limitation and readers of skill in the art will immediately recognize that AC input voltage levels useful in systems that select a redundant power supply mode for powering a computer system may be of any voltage level. Such an AC input voltage may be provided by an input source including, for example, a utility AC source or an Uninterruptible Power Supply ('UPS') AC source.

The system of FIG. 1 also operates generally for selecting a redundant power supply mode by determining, by the voltage monitoring module (108,110,112,114), whether the input voltage level (116,118,120,122) of the power supply is greater than a predetermined threshold value. That is, the voltage monitoring module determines whether the input voltage level is either hi-line or low-line. The voltage monitoring module may determine whether the input voltage level is greater than a predetermined threshold value by use a voltage detector circuit that provides a signal when an input voltage crosses a threshold, by measuring the voltage level with a built-in voltmeter and comparing the measured voltage level to a known threshold voltage level, or in other ways as will occur to those of skill in the art.

If the input voltage level of the power supply is greater than the predetermined threshold value, the voltage monitoring module may configure the power supply for an N+N redundant power supply mode having N primary power supplies and N redundant power supplies, that is, an N+N redundant power supply mode. As mentioned above, the four power supplies (100,102,104,106) in the example of FIG. 1 are configured for an N+N redundant power supply mode (134). A voltage monitoring module may configure a power supply for an N+N redundant power supply mode by opening the power supply's switch, thereby electrically disconnecting the output paths of the power supply. In the example of FIG. 1, power supplies (100,102) may be primary power supplies and the power supplies (104,106) are redundant power supplies.

Consider that AC input (116) and AC input (120) are provided by a UPS, while AC input (118) and AC input (122) are provided by a utility power source. If only the utility power source fails, the power supply (102) and power supply (106) will cease providing power to the computer system (132). The remaining power supplies (100,104) will continue to provide balanced power to the two separate inputs of the computer system (132) without interruption.

As mentioned above, the maximum output power of a power supply may vary with voltage level of its AC input. When changing from one redundant power supply mode to another because of a change in AC input voltage level, overcurrent protection limits based on the first AC input voltage level may not be effective in the second redundant power supply mode having another AC input voltage level. Overcurrent is the condition where the output current of the power supply measured in amperes exceed the rated output capacity. Output current from the power supply may be too high in this sense, an overcurrent, because of an overload, short circuit, or device fault. An overcurrent condition, left unprotected, will cause an excessive or dangerous temperature rise in conductors of the power supply and possibly in other components of the system. The power supply contains overcurrent protection circuitry which operates against an overcurrent trip point. The overcurrent trip point is a variable setting of a maximum amount of electrical current to be output from the power supply. The overcurrent protection circuitry tracks the output current of the power supply and compares it to the overcurrent trip point. If output current exceeds the overcurrent trip point, the overcurrent circuit shuts down the power supply.

The power supplies, when changing from one redundant supply mode to another may adjust overcurrent protection limits, the overcurrent trip point, in dependence upon the input voltage level and an output power capacity of the power supply. Each of the power supplies in the example of FIG. 1 may be configured with a data structure, stored typically in Electrically Erasable Programmable Read Only Memory ('EEPROM'), which associates input voltage levels and maximum power outputs. The voltage monitoring module or other aggregation of hardware and software within the power supply may calculate from the maximum power output associated with the power supply's present AC input voltage level and the power supply's previous overcurrent trip point, a new overcurrent trip. Alternatively, the power supply may be configured with a data structure associating voltage inputs and overcurrent trip points, and the power supply may adjust overcurrent protection limits by finding in the data structure, an overcurrent trip point associated with the power supply's present AC input voltage level.

Consider, for example, a power supply that can provide 1450 Watts maximum output power at 10 VDC when operating at a high-line, 220 VAC, input, or 900 Watts maximum output power at 10 VDC when operating at a low-line, 110 VAC, input. If the power supply is configured with overcurrent protection limits, an overcurrent trip point, for example, equivalent to the maximum current output in amperes ('amps') at 10 VDC, the overcurrent trip point at a low-line input is 90 amps while the overcurrent trip point at a high-line input is 145 amps. When changing from a N+N redundant power supply mode having a high-line input to an N+M redundant power supply mode having a low-line input, the power supply may adjust its overcurrent protection limits then from 145 amps to 90 amps.

In addition to being configured in a redundant power supply mode, the power supplies in the example of FIG. 1 may also be configured in a master-slave relationship. To enable such a master-slave relationship, the power supplies (100, 102, 104, 106) in the example of FIG. 1 are connected to a master power supply signal line (318). The master power supply signal line (318) may be implemented as any communications link for carrying out-of-band signals, such as an Inter-Integrated Circuit ('I²C') bus, a System Management Bus ('SMBus'), an Intelligent Platform Management Bus ('IPMB'), or the like.

The master power supply signal line (318) carries a signal that represents the input voltage level of a master power supply. The master power supply is typically the power supply first installed and providing power to the computer system. When first connected to an AC input source, the voltage monitoring module of the power supply determines whether there is any signal on the master power signal line representing an input voltage level of a master power supply. If there is no such signal, then no other power supply has set the master power supply signal line and no other power supply is currently acting as the master power supply. The power supply, after detecting no master power supply through the master power supply signal line, sets the master power supply signal line to represent the input voltage level of the power supply. In doing so, that power supply becomes the master power supply and any other power supply installed after the master power supply becomes a slave power supply.

Consider as an example that power supply (100) is first to be installed in a system. Also assume for explanation that the AC input (116) is a low-line input, 110 V. Upon detecting through the master power supply signal line (318), no master power supply, the power supply (100) sets the master power supply signal line to represent the input voltage level of the power supply. In this case, the master power supply signal line may be set to a logic low, to represent the input level of the master power supply (100) as a low-line input level. All other power supplies (102, 104, 106) are slave power supplies when connected to the master power supply signal line.

When in a master-slave relationship, power supplies useful in selecting a redundant power supply mode for powering a computer system according to embodiments of the present invention may be configured in various ways. In one configuration, if the slave power supply's input voltage level does not match the master power supplies input voltage level, the slave power supply is disabled. In another configuration, if the master power supply's input voltage level is low-line input, below the predetermined threshold, all slave power supplies will act as if they also have a low-line voltage input, regardless of their actual input.

In the first configuration, upon detecting by the slave power supplies (102, 104, 106) through the master power supply signal line (318) the input voltage level (116) of the master power supply (100), each of slave power supplies determines whether that slave's input voltage level matches the master power supply's input voltage level. If the slave's input voltage level does not match the master power supply's input voltage level, the slave power supply disables itself In the second configuration, if the input voltage level of the master power supply is not greater than the predetermined threshold value, that is, the input voltage is a low-line voltage, upon detecting by the slave power supplies through the master power supply signal line the input voltage level of the master power supply, each of the slave power supplies sets its input voltage level to match the input voltage level of the master power supply. That is, the slave power supplies act as if they have a low-line input voltage, even if they do not, and are configured for an N+M redundant power supply mode.

The arrangement of power supplies, voltage monitoring modules, converters, switches, computer system, and other devices making up the exemplary system illustrated in FIG. 1 are for explanation, not for limitation. Systems useful according to various embodiments of the present invention may include additional power supplies, switches, monitoring modules, computer systems, servers, routers, and other devices, not shown in FIG. 1, as will occur to those of skill in the art. Various embodiments of the present invention may be implemented on a variety of hardware platforms in addition to those illustrated in FIG. 1.

Figure 2:
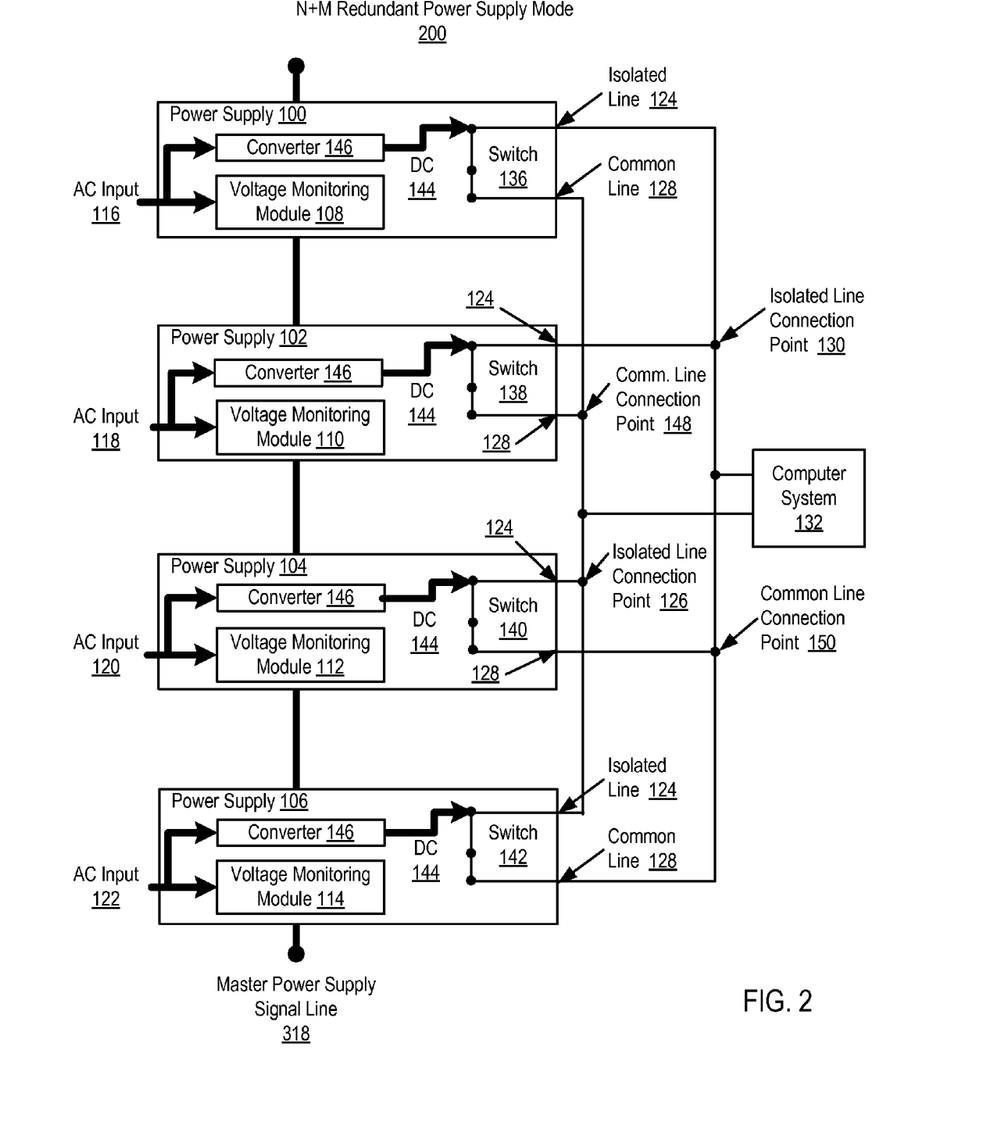
FIG. 2 sets forth a functional block diagram of another exemplary system for selecting a redundant power supply mode for powering a computer system that includes power supplies configured in an N+M redundant power supply mode.

As mentioned above, in addition to being configured in an N+N redundant power supply mode (134) as in the example of FIG. 1, power supplies useful in systems that selecting a redundant power supply mode for powering a computer system in accordance with embodiments of the present invention may also be configured in an N+M redundant power supply mode to provide greater maximum output power under fault. FIG. 2, therefore, sets forth a functional block diagram of another exemplary system for selecting a redundant power supply mode for powering a computer system that includes power supplies configured in an N+M redundant power supply mode (200). The system of FIG. 2 is similar to the system of FIG. 1 including, as it does, several power supplies (100, 102, 104, 106), switches (136, 138, 140, 142), voltage monitoring modules (108, 110, 112, 114), and a computer system (132).

The system of FIG. 2 differs from that of FIG. 1, however, in that the exemplary power supplies in the system of FIG. 2 are configured in an N+M redundant power supply mode (200), where M is less than N. In the system of FIG. 2, for example, power supplies (100, 102, 104) may be primary power supplies and power supply (106) may be a redundant power supply (106). In this sense, if any one of the power supplies fails, the remaining three power supplies provide balanced power to the two inputs of the computer system (132). As described above, an N+M redundant power supply mode also provides greater maximum output power at low-line voltage levels than the N+N redundant power supply mode.

If the input voltage level of an exemplary power supply in the system of FIG. 2 is not greater than the predetermined threshold value, the voltage monitoring module of the power supply configures the power supply for an N+M redundant power supply mode having N primary power supplies and M redundant power supplies. The voltage monitoring module in the example of FIG. 2 may configure a power supply for an N+M redundant power supply mode by closing the power supply's switch, thereby electrically connecting the output paths of the power supply. As shown in the example of FIG. 2, each of the power supplies have a closed switch (136, 138, 140, 142) and the output paths of the power supplies, both common (128) and isolated (124) lines, are electrically connected. Each of the output paths in the example of FIG. 2 is carrying current from a power supply to the computer system (132).

Figure 3:
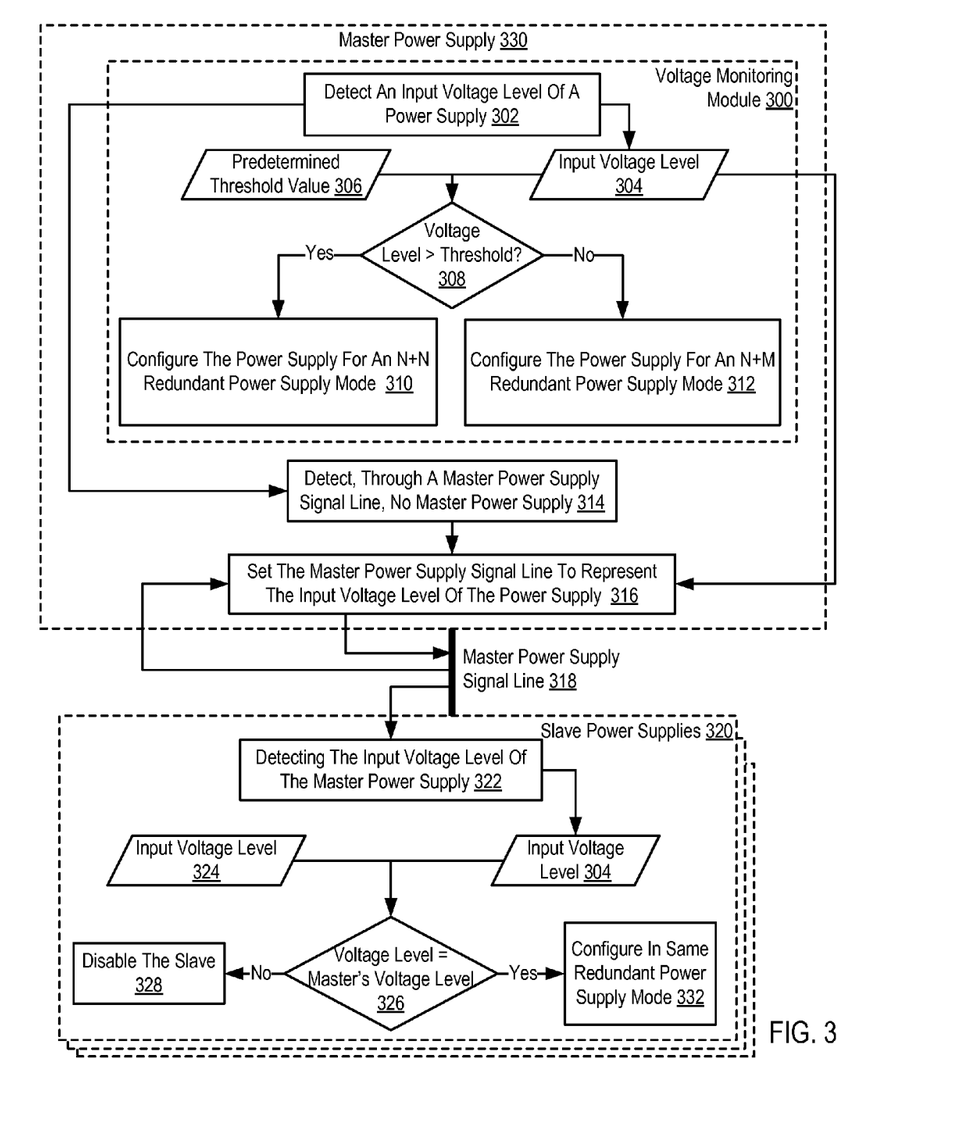
FIG. 3 sets forth a flow chart illustrating an exemplary method for selecting a redundant power supply mode for powering a computer system according to embodiments of the present invention.

For further explanation, FIG. 3 sets forth a flow chart illustrating an exemplary method for selecting a redundant power supply mode for powering a computer system according to embodiments of the present invention. The method of FIG. 3 includes several power supplies (330, 320) that power a computer system (not shown in the FIG. 3). Each power supply, in the example of FIG. 3, has an input voltage and an output, the output connected to at least two output paths, the two output paths capable of being electrically connected. One output path of each power supply is an isolated line and another output path of each power supply is a common line.

The isolated lines of a first group of the power supplies are connected together at an isolated line connection point while the isolated lines of a second group of power supplies are connected together at another isolated line connection point. The common lines of the first group of power supplies are connected together at a common line connection point while the common lines of the second group of power supplies connected together at another common line connection point. Each common line connection point is electrically connected to an isolated line connection point and each common line connection point carries current only when the output paths of a power supply are electrically connected.

The method of FIG. 3 also includes detecting (302), by a voltage monitoring module (300), an input voltage level (304) of a power supply (330). The voltage monitoring module (300) may detect an input voltage level (305) of a power supply in various ways including, for example, by use of a voltage sensing circuit, such as a voltmeter, or other aggregation of hardware and software as will occur to those of skill in the art.

The method of FIG. 3 also includes determining (308), by the voltage monitoring module (300), whether the input voltage level (304) of the power supply (330) is greater than a predetermined threshold value (306). As mentioned above, the voltage monitoring module (300) may determine whether the input voltage level is greater than a predetermined threshold value by use of a voltage detector circuit that provides a signal when an input voltage crosses a threshold, by measuring the voltage level with a built-in voltmeter and comparing the measured voltage level to a known threshold voltage level, or in other ways as will occur to those of skill in the art.

If the input voltage level of the power supply is greater than the predetermined threshold value, the method of FIG. 3 continues by configuring (310), by the voltage monitoring module (300), the power supply (330) for an N+N redundant power supply mode having N primary power supplies and N redundant power supplies. Configuring (310) the power supply for an N+N redundant power supply mode may be carried out by opening a switch, electrically disconnecting the output paths of the power supply.

If the input voltage level of the power supply is not greater than the predetermined threshold value, the method of FIG. 3 continues by configuring (312), by the voltage monitoring module (300), the power supply (330) for an N+M redundant power supply mode having N primary power supplies and M redundant power supplies, where N is greater than M. Configuring (312) the power supply for an N+M redundant power supply mode may be carried out by closing a switch, electrically connecting the output paths of the power supply.

As mentioned above, in some embodiments of the present invention, the power supplies, in addition to being configured in a redundant power supply mode, may also be configured in a master-slave relationship. For further explanation therefore, the method of FIG. 3 also includes detecting (314), by the power supply (330), through a master power supply signal line (318), no master power supply, the master power signal line (318) representing an input voltage level of a master power supply. A power supply may detect no power supply through a master power supply signal line by finding no signal on the master power supply signal line representing an input voltage level of a master power supply. Consider as an example a master power supply signal line with three states, low impedance logic "0" (low), low impedance logic "1" (high), and a high impedance state that allows devices to share the signal line. When the master power supply signal line is set to logic low, the master power supply signal line represents a low-line input voltage level of a master power supply. When the master power supply signal line is set to logic high, the master power supply signal line represents a high-line input voltage level of a master power supply. When the master power supply signal line is in its high impedance state, the master power supply signal line represents that no master power supply has been established. Although only three states are described here for clarity, readers of skill in the art will recognize that any number of states may be used.

The method of FIG. 3 also includes setting (316), by the power supply (330), the master power supply signal line (330) to represent the input voltage level (304) of the power supply (330), the power supply (330) thereby becoming the master power supply (330), all other power supplies (320) becoming slave power supplies (320). Setting a master power supply signal line may be carried out by setting the line to a logic high if the power supply's input voltage level is a low-line input level or logic low if the power supply's input voltage level is a high-line input level.

Upon detecting (322) by the slave power supplies (320) through the master power supply signal line (318) the input voltage level (304) of the master power supply (330), the method of FIG. 3 continues by determining (326) for each of the slave power supplies (320) whether the slave power supply's (320) input voltage level (324) matches the master power supply's input voltage level (304). The slave power supplies may determine whether their input voltage level matches the master power supply's input voltage level by identifying the voltage level of the master power supply as either high-line or low-line in dependence upon the master power supply signal line and determining whether their input voltage level is the same.

If the slave power supply's (320) input voltage level (324) does not match the master power supply's input voltage level (304), the method of FIG. 3 continues by disabling (328) the slave power supply. Disabling the slave power supply may be carried out by electrically disconnecting from the output paths of a power supply a DC power source provided by an AC to DC converter within the power supply. If the slave power supply's (320) input voltage level (324) does match the master power supply's input voltage level (304), the method of FIG. 3 continues by configuring (332) the slave power supply in the same redundant power supply mode as the master power supply (330)—if the input is a high-line input, opening a switch, electrically disconnecting the output paths of the power supply, if the input is a low-line input, closing the switch, electrically connecting the output paths of the power supply.

Figure 4:
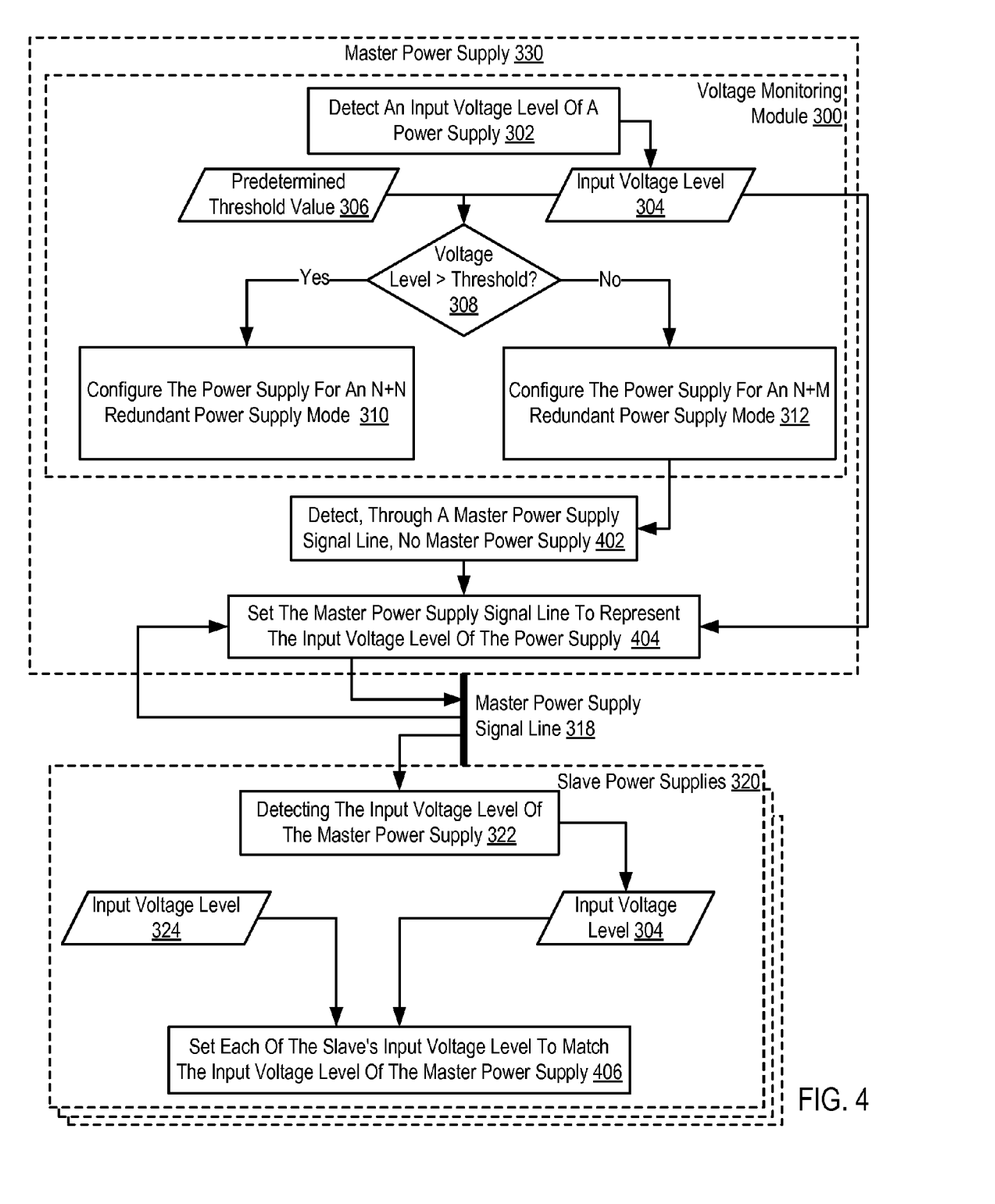
FIG. 4 sets forth a flow chart illustrating a further exemplary method for selecting a redundant power supply mode for powering a computer system according to embodiments of the present invention.

For further explanation, FIG. 4 sets forth a flow chart illustrating a further exemplary method for selecting a redundant power supply mode for powering a computer system according to embodiments of the present invention. The method of FIG. 4 is similar to the method of FIG. 3 including, as it does, the voltage monitoring module's (300) detecting (302) an input voltage level (304) of a power supply (330); determining (308) whether the input voltage level (304) of the power supply (330) is greater than a predetermined threshold value (306); if the input voltage level of the power supply is greater than the predetermined threshold value, configuring (310) the power supply (330) for an N+N redundant power supply mode having N primary power supplies and N redundant power supplies; and if the input voltage level of the power supply is not greater than the predetermined threshold value, configuring the power supply for an N+M redundant power supply mode having N primary power supplies and M redundant power supplies, where N is greater than M.

If the input voltage level (304) of the power supply (330) is not greater than the predetermined threshold value (306), the method of FIG. 4, like the method of FIG. 3, includes detecting (402), by the power supply (302), through a master power supply signal line (318), no master power supply and setting (404), by the power supply (330), the master power supply signal line (318) to represent the input voltage level (304) of the power supply (330), the power supply thereby becoming the master power supply (330), all other power supplies becoming slave power supplies (320).

Upon detecting (322) by the slave power supplies (320) through the master power supply signal line (318) the input voltage level (304) of the master power supply (330), however, the method of FIG. 4 differs from the method of FIG. 3 in that the method of FIG. 4 includes setting (406) each of the slave power supply's (320) input voltage level (304) to match the input voltage level (304) of the master power supply (330). That is, if the input voltage level (304) of the master power supply (330) is a low-line input voltage level, a voltage level below the predetermined threshold, all slave power supplies will act is if they are also powered by a low-line input voltage. Specifically, all slave power supplies will be configured for an N+M redundant power supply mode.

Figure 5:
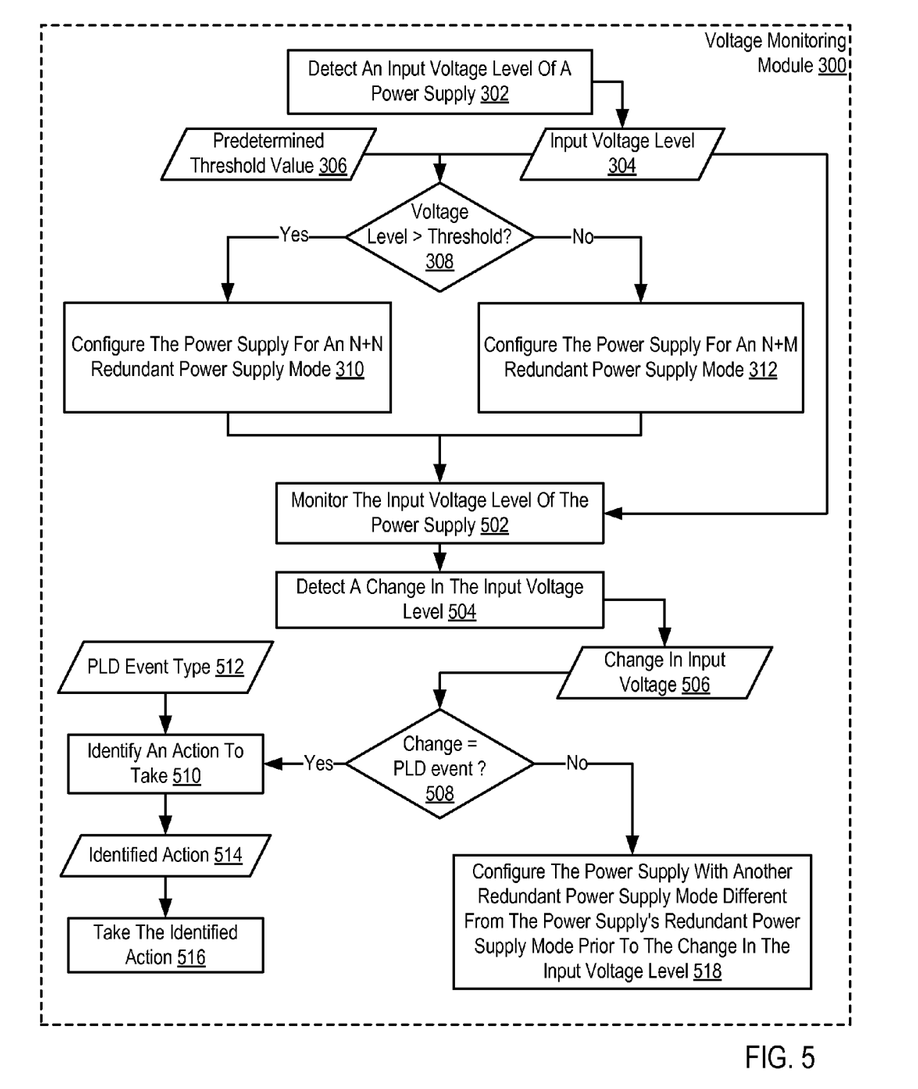
FIG. 5 sets forth a flow chart illustrating a further exemplary method for selecting a redundant power supply mode for powering a computer system according to embodiments of the present invention.

For further explanation, FIG. 5 sets forth a flow chart illustrating a further exemplary method for selecting a redundant power supply mode for powering a computer system according to embodiments of the present invention. The method of FIG. 5 is similar to the method of FIG. 3 including, as it does, the voltage monitoring module's (300) detecting (302) an input voltage level (304) of a power supply (330); determining (308) whether the input voltage level (304) of the power supply (330) is greater than a predetermined threshold value (306); if the input voltage level of the power supply is greater than the predetermined threshold value, configuring (310) the power supply (330) for an N+N redundant power supply mode having N primary power supplies and N redundant power supplies; and if the input voltage level of the power supply is not greater than the predetermined threshold value, configuring the power supply for an N+M redundant power supply mode having N primary power supplies and M redundant power supplies, where N is greater than M.

The method of FIG. 5 differs from the method of FIG. 3, however, in that the method of FIG. 5 includes monitoring (502), by the voltage monitoring module (300) during operation of the power supply, the input voltage level (304) of the power supply. The voltage monitoring module (300) may monitor the input voltage level (304) of the power supply by use a voltage sensor, a voltage detector circuit that provides a signal when an input voltage crosses a particular threshold, or other voltage measuring equipment as will occur to those of skill in the art.

The method of FIG. 5 also includes detecting (504), by the voltage monitoring module (300), a change (506) in the input voltage level (304), the change (506) in the input voltage level representing the input voltage level (304) crossing the predetermined threshold. Detecting a change may be carried out with a voltage detector circuit as described above that provides an output signal when an input voltage level crosses a particular threshold.

Responsive to detecting the change in the input voltage level, the method of FIG. 5 continues by determining (508) whether the change (506) in the input voltage level is a power line disturbance ('PLD') event. A PLD event is an event caused by a disturbance in the input power of a power supply. Examples of PLD events include:

A sag, a short duration drop in voltage level;

A surge, a short duration increase or spike in voltage level lasting as little as a few millionths of a second and varying from a few hundred volts to several thousand volts;

Noise, a continuous distortion of a normal voltage level;

Momentary interruption, a brief loss of power lasting from a fraction of a second to as long as a minute;

A power outage, an interruption of power;

And others as will occur to those of skill in the art.

It is undesirable for a power supply to change from one redundant power supply mode to another during operation if only a PLD event has occurred, not an actual long-term change in the voltage level an input AC source. Moreover, if a PLD event has occurred specific actions taken by a power supply are typically necessary to protect the power supply and devices it powers.

If the change (506) in the input voltage level is a PLD event, the method of FIG. 5 continues by identifying (510) an action (514) to take in dependence upon a type of the PLD event (512) and taking (516) the identified action (510). Different PLD event types require different actions to protect the computer system, power supplies, and other devices powered by the power supply. Consider for example a PLD event that is a surge. To protect the computer system, power supplies, and other devices powered by the power supply would be a power supply may identify an action, such as limiting output current, and may take the identified action.

If the change (506) in the input voltage level (304) is not a PLD event, the method of FIG. 5 continues by configuring (518) the power supply with another redundant power supply mode different from the power supply's redundant power supply mode prior to the change in the input voltage level. In this way, a power supply may be dynamically configured during operation of the power supply for various redundant power supply modes in dependence upon the power supply's present input voltage level. When the input voltage level of a power supply changed from high-line to low-line or vice versa, the power supply is automatically configured from an N+N redundant power supply mode to and N+M redundant power supply mode or vice versa.

In view of the explanations set forth above, readers will recognize that the benefits of selecting a redundant power supply mode for powering a computer system according to embodiments of the present invention include:

Automatically configuring power supplies to provide a necessary amount of power output and redundancy in dependence upon an input voltage level of the power supplies.

Providing automatic configuration of master-slave relationships among power supplies, the configuration controlling the redundant power supply mode in which the power supplies are configured.

And other benefits as will occur to those of skill in the art.

Exemplary embodiments of the present invention are described largely in the context of a fully functional computer system for selecting a redundant power supply mode for powering a computer system. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of selecting a redundant power supply mode for powering a computer system, the computer system powered by a plurality of power supplies, each power supply having an input voltage and an output, the output connected to at least two output paths, the two output paths capable of being electrically connected, one output path of each power supply comprising an isolated line, another output path of each power supply comprising a common line, the isolated lines of a first group of the power supplies connected together at an isolated line connection point, the isolated lines of a second group of power supplies connected together at another isolated line connection point, the common lines of the first group of power supplies connected together at a common line connection point, the common lines of the second group of power supplies connected together at another common line connection point, each common line connection point electrically connected to an isolated line connection point, each common line connection point carrying current only when the output paths of a power supply are electrically connected, the method comprising:

detecting, by a voltage monitoring module, an input voltage level of a power supply;

determining, by the voltage monitoring module, whether the input voltage level of the power supply is greater than a predetermined threshold value;

if the input voltage level of the power supply is greater than the predetermined threshold value, configuring, by the voltage monitoring module, the power supply for an N+N redundant power supply mode having N primary power supplies and N redundant power supplies, wherein N is an integer greater than zero; and if the input voltage level of the power supply is not greater than the predetermined threshold value, configuring, by the voltage monitoring module, the power supply for an N+M redundant power supply mode having N primary power supplies and M redundant power supplies, wherein M is an integer greater than zero and N is greater than M.

2. The method of claim 1 further comprising:

detecting, by the power supply, through a master power supply signal line, no master power supply, the master power signal line representing an input voltage level of a master power supply;

setting, by the power supply, the master power supply signal line to represent the input voltage level of the power supply, the power supply thereby becoming the master power supply, all other power supplies becoming slave power supplies;

upon detecting by the slave power supplies through the master power supply signal line the input voltage level of the master power supply, determining for each of the slave power supplies whether the slave power supply's input voltage level matches the master power supply's input voltage level; and if the slave power supply's input voltage level does not match the master power supply's input voltage level, disabling the slave power supply.

3. The method of claim 1 further comprising:

if the input voltage level of the power supply is not greater than the predetermined threshold value:

detecting, by the power supply, through a master power supply signal line, no master power supply, the master power signal line representing an input voltage level of a master power supply;

setting, by the power supply, the master power supply signal line to represent the input voltage level of the power supply, the power supply thereby becoming the master power supply, all other power supplies becoming slave power supplies; and upon detecting by the slave power supplies through the master power supply signal line the input voltage level of the master power supply, setting each of the slave power supply's input voltage level to match the input voltage level of the master power supply.

4. The method of claim 1 further comprising:

monitoring, by the voltage monitoring module during operation of the power supply, the input voltage level of the power supply;

detecting, by the voltage monitoring module, a change in the input voltage level, the change in the input voltage level representing the input voltage level crossing the predetermined threshold;

responsive to detecting the change in the input voltage level, determining whether the change in the input voltage level is a power line disturbance ('PLD') event;

if the change in the input voltage level is a PLD event:

identifying an action to take in dependence upon a type of the PLD event;

taking the identified action; and if the change in the input voltage level is not a PLD event, configuring the power supply with another redundant power supply mode different from the power supply's redundant power supply mode prior to the change in the input voltage level.

5. The method of claim 1 wherein configuring, by the voltage monitoring module, the power supply for an N+N redundant power supply mode having N primary power supplies and N redundant power supplies further comprises:

adjusting overcurrent protection limits in dependence upon the input voltage level and an output power capacity of the power supply; and electrically disconnecting the output paths of the of power supply.

6. The method of claim 1 wherein configuring, by the voltage monitoring module, the power supply for a N+M redundant power supply mode having N primary power supplies and M redundant power supplies, where N is greater than M further comprises:

adjusting overcurrent protection limits in dependence upon the input voltage and an output power capacity of the power supply; and electrically connecting the output paths of the of power supply.

7. Apparatus for selecting a redundant power supply mode for powering a computer system, the computer system powered by a plurality of power supplies, each power supply having an input voltage and an output, the output connected to at least two output paths, the two output paths capable of being electrically connected, one output path of each power supply comprising an isolated line, another output path of each power supply comprising a common line, the isolated lines of a first group of the power supplies connected together at an isolated line connection point, the isolated lines of a second group of power supplies connected together at another isolated line connection point, the common lines of the first group of power supplies connected together at a common line connection point, the common lines of the second group of power supplies connected together at another common line connection point, each common line connection point electrically connected to an isolated line connection point, each common line connection point carrying current only when the output paths of a power supply are electrically connected, the apparatus comprising a computer processor, a computer memory operatively coupled to the computer processor, the computer memory having disposed within it computer program instructions capable of:

detecting, by a voltage monitoring module, an input voltage level of a power supply;

determining, by the voltage monitoring module, whether the input voltage level of the power supply is greater than a predetermined threshold value;

if the input voltage level of the power supply is greater than the predetermined threshold value, configuring, by the voltage monitoring module, the power supply for an N+N redundant power supply mode having N primary power supplies and N redundant power supplies, wherein N is an integer greater than zero; and if the input voltage level of the power supply is not greater than the predetermined threshold value, configuring, by the voltage monitoring module, the power supply for an N+M redundant power supply mode having N primary power supplies and M redundant power supplies, where N is greater than M.

8. The apparatus of claim 7 further comprising computer program instructions capable of:

detecting, by the power supply, through a master power supply signal line, no master power supply, the master power signal line representing an input voltage level of a master power supply;

setting, by the power supply, the master power supply signal line to represent the input voltage level of the power supply, the power supply thereby becoming the master power supply, all other power supplies becoming slave power supplies;

upon detecting by the slave power supplies through the master power supply signal line the input voltage level of the master power supply, determining for each of the slave power supplies whether the slave power supply's input voltage level matches the master power supply's input voltage level; and if the slave power supply's input voltage level does not match the master power supply's input voltage level, disabling the slave power supply.

9. The apparatus of claim 7 further comprising computer program instructions capable of:

if the input voltage level of the power supply is not greater than the predetermined threshold value:

detecting, by the power supply, through a master power supply signal line, no master power supply, the master power signal line representing an input voltage level of a master power supply;

setting, by the power supply, the master power supply signal line to represent the input voltage level of the power supply, the power supply thereby becoming the master power supply, all other power supplies becoming slave power supplies; and upon detecting by the slave power supplies through the master power supply signal line the input voltage level of the master power supply, setting each of the slave power supply's input voltage level to match the input voltage level of the master power supply.

10. The apparatus of claim 7 further comprising computer program instructions capable of:

monitoring, by the voltage monitoring module during operation of the power supply, the input voltage level of the power supply;

detecting, by the voltage monitoring module, a change in the input voltage level, the change in the input voltage level representing the input voltage level crossing the predetermined threshold;

responsive to detecting the change in the input voltage level, determining whether the change in the input voltage level is a power line disturbance ('PLD') event;

if the change in the input voltage level is a PLD event:
identifying an action to take in dependence upon a type of the PLD event;
taking the identified action; and if the change in the input voltage level is not a PLD event, configuring the power supply with another redundant power supply mode different from the power supply's redundant power supply mode prior to the change in the input voltage level.

11. The apparatus of claim 7 wherein configuring, by the voltage monitoring module, the power supply for an N+N redundant power supply mode having N primary power supplies and N redundant power supplies further comprises:

adjusting overcurrent protection limits in dependence upon the input voltage level and an output power capacity of the power supply; and electrically disconnecting the output paths of the of power supply.

12. The apparatus of claim 7 wherein configuring, by the voltage monitoring module, the power supply for a N+M redundant power supply mode having N primary power supplies and M redundant power supplies, where N is greater than M further comprises:

adjusting overcurrent protection limits in dependence upon the input voltage and an output power capacity of the power supply; and electrically connecting the output paths of the of power supply.

13. A computer program product for selecting a redundant power supply mode for powering a computer system, the computer system powered by a plurality of power supplies, each power supply having an input voltage and an output, the output connected to at least two output paths, the two output paths capable of being electrically connected, one output path of each power supply comprising an isolated line, another output path of each power supply comprising a common line, the isolated lines of a first group of the power supplies connected together at an isolated line connection point, the isolated lines of a second group of power supplies connected together at another isolated line connection point, the common lines of the first group of power supplies connected together at a common line connection point, the common lines of the second group of power supplies connected together at another common line connection point, each common line connection point electrically connected to an isolated line connection point, each common line connection point carrying current only when the output paths of a power supply are electrically connected, the computer program product stored in a computer storage medium, the computer program product comprising computer program instructions capable of:

detecting, by a voltage monitoring module, an input voltage level of a power supply;

determining, by the voltage monitoring module, whether the input voltage level of the power supply is greater than a predetermined threshold value;

if the input voltage level of the power supply is greater than the predetermined threshold value, configuring, by the voltage monitoring module, the power supply for an N+N redundant power supply mode having N primary power supplies and N redundant power supplies, wherein N is an integer greater than zero; and     if the input voltage level of the power supply is not greater than the predetermined threshold value, configuring, by the voltage monitoring module, the power supply for an N+M redundant power supply mode having N primary power supplies and M redundant power supplies, where N is greater than M.

14. The computer program product of claim 13 further comprising computer program instructions capable of:

detecting, by the power supply, through a master power supply signal line, no master power supply, the master power signal line representing an input voltage level of a master power supply;

setting, by the power supply, the master power supply signal line to represent the input voltage level of the power supply, the power supply thereby becoming the master power supply, all other power supplies becoming slave power supplies;

upon detecting by the slave power supplies through the master power supply signal line the input voltage level of the master power supply, determining for each of the slave power supplies whether the slave power supply's input voltage level matches the master power supply's input voltage level; and     if the slave power supply's input voltage level does not match the master power supply's input voltage level, disabling the slave power supply.

15. The computer program product of claim 13 further comprising computer program instructions capable of:

if the input voltage level of the power supply is not greater than the predetermined threshold value:

detecting, by the power supply, through a master power supply signal line, no master power supply, the master power signal line representing an input voltage level of a master power supply;

setting, by the power supply, the master power supply signal line to represent the input voltage level of the power supply, the power supply thereby becoming the master power supply, all other power supplies becoming slave power supplies; and     upon detecting by the slave power supplies through the master power supply signal line the input voltage level of the master power supply, setting each of the slave power supply's input voltage level to match the input voltage level of the master power supply.

16. The computer program product of claim 13 further comprising computer program instructions capable of:

monitoring, by the voltage monitoring module during operation of the power supply, the input voltage level of the power supply;

detecting, by the voltage monitoring module, a change in the input voltage level, the change in the input voltage level representing the input voltage level crossing the predetermined threshold;

responsive to detecting the change in the input voltage level, determining whether the change in the input voltage level is a power line disturbance ('PLD') event;

if the change in the input voltage level is a PLD event:

identifying an action to take in dependence upon a type of the PLD event;

taking the identified action; and     if the change in the input voltage level is not a PLD event, configuring the power supply with another redundant power supply mode different from the power supply's redundant power supply mode prior to the change in the input voltage level.

17. The computer program product of claim 13 wherein configuring, by the voltage monitoring module, the power supply for an N+N redundant power supply mode having N primary power supplies and N redundant power supplies further comprises:

adjusting overcurrent protection limits in dependence upon the input voltage level and an output power capacity of the power supply; and     electrically disconnecting the output paths of the of power supply.

18. The computer program product of claim 13 wherein configuring, by the voltage monitoring module, the power supply for a N+M redundant power supply mode having N primary power supplies and M redundant power supplies, where N is greater than M further comprises:

adjusting overcurrent protection limits in dependence upon the input voltage and an output power capacity of the power supply; and     electrically connecting the output paths of the of power supply.

19. The computer program product of claim 13 wherein the computer readable medium comprises a recordable medium.

20. The computer program product of claim 13 wherein the computer readable medium comprises a transmission medium.

* * * * *